Figure 1:
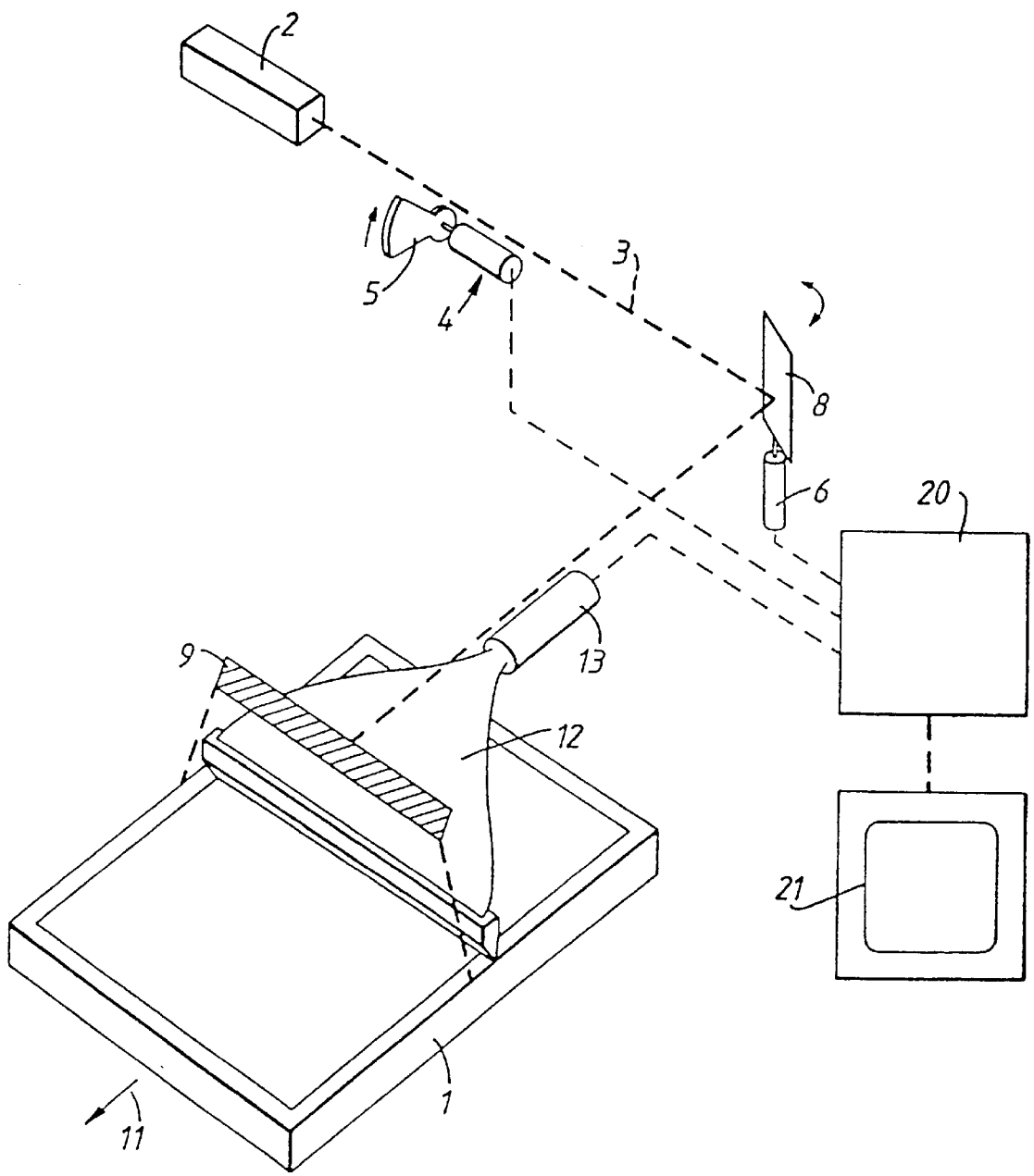

United States Patent [19]
Verbeke

[11] Patent Number: 5,814,831
[45] Date of Patent: Sep. 29, 1998

[54] RADIATION READ OUT APPARATUS

[75] Inventor: Gentil Verbeke, Edegem, Belgium

[73] Assignee: Agfa-Gevaert, Mortsel, Belgium

[21] Appl. No.: 773,188

[22] Filed: Dec. 27, 1996

[30] Foreign Application Priority Data

Jan. 16, 1996 [EP] European Pat. Off. .............. 96200104

[51] Int. Cl.$^6$ ................................................. G03B 42/02
[52] U.S. Cl. ........................................... 250/586; 250/584
[58] Field of Search ..................... 250/584, 585, 250/586

[56] References Cited

U.S. PATENT DOCUMENTS

| | | | |
|---|---|---|---|
| 4,346,295 | 8/1982 | Tanaka et al. | 250/586 |
| 4,736,102 | 4/1988 | Morrone | 250/585 |
| 4,873,438 | 10/1989 | Hosoi et al. | 250/586 |
| 5,047,643 | 9/1991 | Ogura | 250/584 |
| 5,138,161 | 8/1992 | Miyagawa et al. . | |

FOREIGN PATENT DOCUMENTS

| | | |
|---|---|---|
| 0169965 | of 0000 | European Pat. Off. . |
| 0210505 | of 0000 | European Pat. Off. . |
| 0451913 | of 0000 | European Pat. Off. . |
| 0657749 | of 0000 | European Pat. Off. . |
| 6-160311 | 6/1994 | Japan .................................... 250/586 |

Primary Examiner—Edward J. Glick
Attorney, Agent, or Firm—Baker & Botts, L.L.P.

[57] ABSTRACT

To minimize the adverse effects of flare in a photostimulable phosphor read out apparatus, the input face of a light guide for guiding light emitted upon stimulation has an elliptical cross section. It is positioned so that one of the foci of the ellipse defining the elliptical cross section coincides with the scan line. The second focus is positioned above the scan line and in the vicinity of the second focus a light beam reflection preventing means is provided so that stimulation light reflected by the input face of the light guide is extinguished. In an alternative embodiment the light guide has a circular cross section and is positioned so that the axis of a cylinder comprising the input face does not coincide with the scan line.

7 Claims, 3 Drawing Sheets

RADIATION READ OUT APPARATUS

This application claims the benefit of U.S. provisional patent application Ser. No. 60/014,548, filed Apr. 3, 1996.

1. FIELD OF THE INVENTION

The present invention relates to a system for read-out of a radiation image stored in a photostimulable phosphor screen.

2. BACKGROUND OF THE INVENTION

In the field of digital radiography a system has been developed wherein X-rays transmitted by an exposed object (such as the body of a patient) are stored in a photostimulable phosphor screen. Such a photostimulable phosphor screen comprises a layer of photostimulable luminescent material which comprises a phosphor, for example a europium-activated barium fluoro-halide, and a binder. The phosphor has the characteristic that it can be energised to an excited state by X-rays, and can then be stimulated by light within a first wavelength range to return to the ground state with the emission of light within a second wavelength range. The stimulating radiation is arranged to have a different wavelength from the emitted light. With regard to the specific example wherein a radiation image is stored in a screen comprising a europium-activated barium fluoro-halide phosphor, the stimulating light is situated within the range of 600–700 nm and the emitted light is situated within the range of 300–400 nm.

In order to read the image stored in the exposed screen, the screen is transported past a scanning station where the screen is two-dimensionally scanned with stimulating light. For this purpose stimulating light beam of a wavelength within said first or stimulating wavelength range is deflected so as to scan the screen in a first direction (called main scan direction) while the screen is transported in a second direction that is perpendicular to the main scan direction.

Light emitted upon stimulation is guided through a light guide member onto an opto-electric transducer such as a photomultiplier that converts the emitted light into a corresponding electric signal.

Preferably a filter is positioned either at the entrance face of the light guide or between the output of the light guide and the opto-electrical transducer for preventing stimulating light from being detected by the opto-electrical transducer.

A number of different embodiments of a light guide can be applied.

In one embodiment, a light guide comprises a bundle of juxtaposed optical fibres. The input ends of this bundle are arranged in a line or a multiplicity of parallel lines. The output ends are bundled so that light entering the light guide through the input ends of the fibres, is guided towards an opto-electric transducer (a photomultiplier) positioned in the vicinity of the bundled output ends.

In another embodiment, the light guide is made of a light transmissive thermoplastic material such as an acrylic resin shaped (e.g. by heating) so that its input face is in the form of a line that can be positioned parallel to the main scanning direction and its output face is rounded to conform to the light-receiving face of the used opto-electric transducer.

Still other embodiments may be considered.

Since the photostimulable phosphor screen is a diffuse reflector, both the stimulated emission and stimulation light that is reflected by the screen follow the same path. Inevitably some of the reflected stimulation light is reflected a second time by input face of the light guide member. When, however, this reflected stimulation light reaches the photostimulable phosphor screen at a position that is distant from the position where the beam of stimulation light is scanning the photostimulable phosphor screen at a particular point in time, the phosphor screen is stimulated at that distant position. A kind of in-direct stimulation is obtained.

Locations on the photostimulable phosphor screen that are stimulated by so-called in-direct stimulation, emit light that enters the light guide means together with the light emitted from a location that is directly stimulated. This light emitted upon indirect stimulation, is treated as if it were image information originating from the scanned location on the screen.

So, the finally obtained image signal will be incorrect.

This phenomenon is classified under the general denomination 'flare', although flare may originate from other effects as well. Flare is particularly disadvantageous since it has the adverse effect of adding noise to the system, thereby reducing the signal-to-noise ratio of the read-out signal.

Moreover, it gives rise to false or ghost images which substantially degrade the quality of the ultimate image.

Flare is particularly troublesome in applications where the input signal has a large dynamic range. An example of such an application is autoradiography, i.e. tracing of radioisotopes, e.g. in D.N.A. sequencing, where flare from a heavily exposed area may influence the read out signal even when the stimulating light spot is still tenths of millimeters away from this area.

The problem is well known and has been addressed several times in the state of the art.

For example in EP 169 966 as well as in EP 169 965 flare caused by reflection of stimulating rays by the light guide means has been addressed.

In EP 169 966 this problem is solved by the provision of a 'stimulating ray reflection preventing means' that is positioned between the portion of the screen that is scanned and the light guide member. This 'stimulating ray reflection preventing means' is used in combination with a 'means for preventing transmission of the stimulating rays' that is positioned between the portion of the screen that is scanned and the photo-electric convertor.

In a particular embodiment an anti-reflection film is overlaid on the light-input face of the light guide and a filter is provided between the light output of the light guide and the input of the convertor, said filter filtering out any stimulating rays that would otherwise reach the input face of the convertor.

In EP 169 965 the problem is solved by similar provisions. However, 'means for preventing transmission of the stimulating rays' are positioned between a light guiding mirror and the photoelectric convertor. In a particular embodiment the 'stimulating ray reflection preventing means' is constituted as an anti-reflection film that is overlaid on the reflecting surface of a reflection mirror and the 'means for preventing transmission of the stimulating rays' are constituted of a filter.

U.S. Pat. No. 5,015,852 provides still another alternative. A stimulating ray anti-reflection film is overlaid on the light input face of a light guide and, further, may be overlaid over any provided reflection mirror. The stimulating rays anti-reflection film is designed so that the reflectivity of the stimulating rays from the stimulating ray anti-reflection film is lowest when the stimulating rays impinge thereupon at an angle of incidence which falls within the range of 30 degrees to 50 degrees.

In U.S. Pat. No. 5,138,161 it has been proposed that the read out apparatus comprises at least one of the following means: a flare absorbing means that is located on the back side of a so-called condenser mirror, a slit plate provided between the scanning optical unit and a light collecting unit, a flexible light-shielding member suspended on the exit face of the light guide to prevent the flare from being reflected towards the entrance face of the light guide.

The solutions proposed in the above-mentioned disclosures are all based on the provision of means that prevent the reflection of the stimulation rays in addition to conventional light guiding means.

In U.S. Pat. No. 4,970,394 another approach has been chosen. This application the problem of flare has been solved by the particular design of the input face of the photo-detector.

The photo-detector in this patent has a light collecting face (light guide) which has an elongated input face positioned in proximity to the scan line to collect stimulated emission light. The light collecting face comprises a multiplicity of spaced optical projections extending outwardly from said input face. The projections are made from a material that is transparent to light emitted upon stimulation. They have a profile such as to minimize reflection of incident photons.

Several adequate shapes of said projections have been described such as an array of saw-tooth optical wedges, pyramid-shaped or cone shaped projections.

3. OBJECTS OF THE INVENTION

It is an object of the present invention to provide a radiation image read out apparatus wherein stimulating rays, which have impinged upon a position on a photostimulable phosphor screen being scanned at a given instance, are prevented from impinging upon and stimulating other portions of the screen that are not being scanned at the given instance and that are spaced apart from the position which is being scanned.

It is a further object to prevent stimulating rays that are reflected by a light guide means from stimulating other portions of a photostimulable phosphor screen.

It is still a further object of this invention to minimize the adverse effects of flare without reducing the high efficiency of the light-collection characteristics of the light guide member.

Further objects of the present invention will become apparent from the description hereinafter.

4. STATEMENT OF THE INVENTION

To meet the above objectives the invention provides a radiation image read out apparatus comprising a system for line-wise scanning by means of stimulating rays a photostimulable phosphor screen carrying a radiation image, a photo-electric transducer for converting light emitted upon stimulation into an electric signal representation and a light guide member for guiding light emitted upon stimulation to said transducer, said light guide member having an input face positioned in the vicinity of a line of said screen that is scanned by said stimulating rays, characterised in that (i) a cross section of the input face of the light guide member in a plane perpendicular to a scanned line and perpendicular to said screen has a substantially elliptical profile and (ii) said light guide member is arranged so that one focus of the ellipse defining said elliptical profile coincides with the line that is scanned and the second focus is positioned above the photostimulable phosphor screen.

Preferably a light absorbing means is provided in the vicinity of the second focus so as to absorb light reflected by the input face of the light guide.

In an alternative embodiment (i) the cross section of the input face of the light guide member in a plane perpendicular to the screen and perpendicular to a scanned line, has a substantially circular profile and (ii) said light guide member is arranged so that the axis of a cylinder comprising said input face does not coincide with the scanned line.

Optionally a light absorbing means is provided for absorbing light reflected by the light input face of said light guide so as to prevent light from being reflected by the light guide onto the scan line.

In the context of the present invention the term 'cross section' refers to a section of the light guide in a vertical plane, i.e. a plane perpendicular to the plane wherein a phosphor screen is transported during scanning and perpendicular to a scan line.

In either of the described embodiments the term 'substantially' is meant to cover an embodiment wherein the cross-section is indeed elliptically or circular curved as well as an embodiment wherein an elliptically or circular curved cross section of the light guide is approximated, for example by a multiplicity of plane surfaces, so that in this way the envisaged effect of directing stimulation light falling onto the input face of the light guide in a direction so that it does not stimulate neighbouring pixels of a pixel that is being scanned, is also obtained.

The apparatus of the present invention provides that the portion of stimulating radiation that would eventually be reflected by the input face of the light guide member, is prevented from stimulating another portion of the phosphor screen, more particularly it is prevented from stimulating neighbouring pixels of a pixel that is being scanned.

In this way influence of non-scanned portions of an image on the electric image signal corresponding with a scanned portion is eliminated and the signal-to-noise ratio of the finite image signal is thus enhanced.

In a particular embodiment the optical system for line-wise scanning a photostimulable phosphor screen carrying a radiation image by means of stimulating rays, comprises a source of stimulating radiation, e.g. a laser emitting light within a wavelength range adapted to the stimulation wavelength range of the used phosphor.

The system further comprises means for deflecting the stimulating rays in a first direction or main scan direction so that the phosphor screen is line-wise scanned in said first direction. An example of a suitable deflection system is a galvanometer mirror.

The system further comprises means for transporting the phosphor screen in a second or sub-scan direction that is perpendicular to said first direction so that a raster scan of the entire image can be obtained.

Other systems, although more complex than the above described embodiment, are possible. Among such alternatives are systems wherein the screen is held stationary and the stimulating beam is deflected so as to scan the screen in a two-dimensional fashion. However, such systems would be far more complicated (e.g. with regard to the aspect of light guiding).

In one embodiment the light guide comprises a large number of optical fibres that are juxtaposed at the input face of the light guide so as to form a line or a plurality of parallel lines and that are bundled at the output face so that they can be optically coupled to the input face of an opto-electrical transducer.

In another embodiment said light guide comprises a sheet of transparent thermoplastic resin such as acrylic resin or the like. The light guide has a flat, linear and elongated input face which is positioned in the vicinity of a scan line. The opposing end is curled so as to provide a flat, annular or circular surface which is to be optically coupled to the opto-electrical transducer. A light guide of this kind has been described for example in U.S. Pat. No. 4,346,295. The light entering the light guide member through the flat end is guided to the annular end by repeated total reflection.

5. BRIEF DESCRIPTION OF THE DRAWINGS

Figure 2:
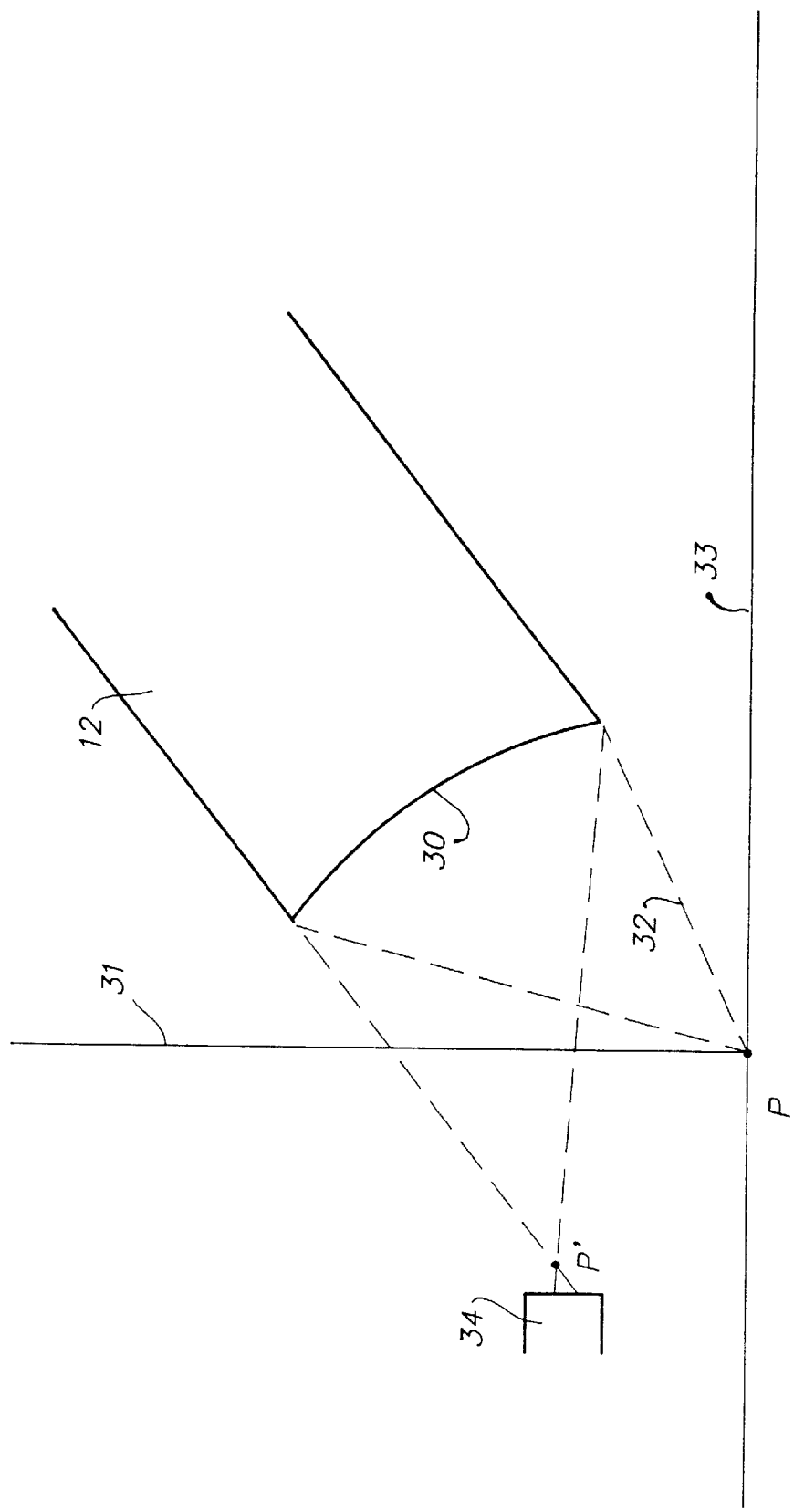
Figure 3:
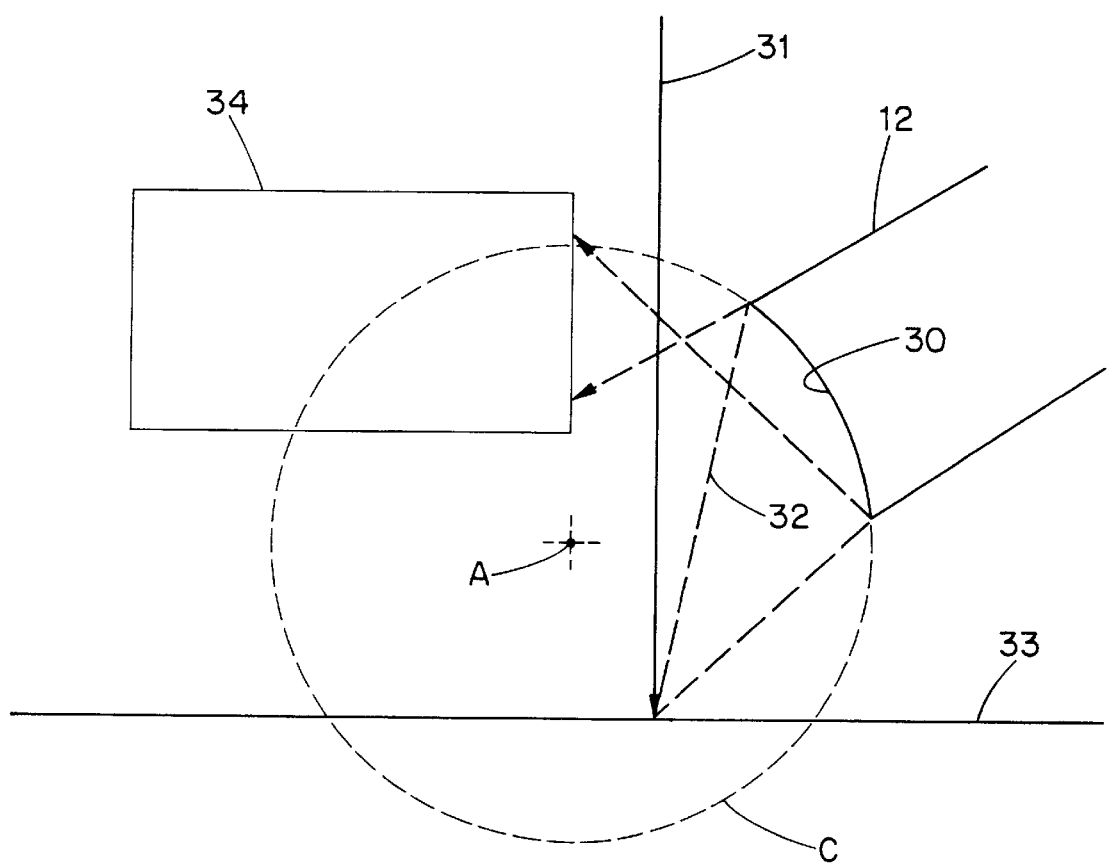

The invention will now be described in more detail, by way of example, with reference to the accompanying drawings, in which:

FIG. 1 generally illustrates an apparatus for reading out a photostimulable phosphor screen, FIG. 2 is a detailed view of a light guide member and a light reflection preventing means in accordance with the present invention, and FIG. 3 is a cross-sectional view of another embodiment of a light guide member and a light absorbing means in accordance with the present invention.

6. DETAILED DESCRIPTION OF THE DRAWINGS

In FIG. 1, a photostimulable phosphor screen read-out apparatus is shown. After a stimulable phosphor sheet 1 is exposed to radiation, such as to X-rays, passing through an object to have a radiation image stored there on, it is sent to the read-out station shown in FIG. 1. A laser beam 3, having a wavelength of 633 nm, is emitted from a helium-neon laser source 2, and directed towards a galvanometer mirror 8. Drive means 6 cause the galvanometer mirror to reciprocate in a triangular wave pattern. A light chopper 4, including a rotating disc segment 5, is positioned to enable the disc segment to interrupt the laser beam pathway during the galvanometer retrace step.

Various laser beam focusing devices, known in the art, not shown in the drawings, ensure a uniform beam diameter during scanning of the beam on the phosphor sheet and also ensure that the uniform angular velocity of the reciprocating mirror 8 results in the laser spot travelling across the phosphor sheet at a uniform linear speed. The laser beam 3 is one-dimensionally deflected by the galvanometer mirror 8 and by a plane reflection mirror 9 onto the phosphor sheet 1. Transport means not shown are provided to transport the sheet 1 at a uniform speed of 12.5 mm/sec in the direction of the arrow 11, to enable the whole sheet to be scanned in a uniform manner.

Positioned close to, but behind the scanning line of the laser beam 3 on the phosphor sheet 1, is a light guide 12 which receives light emitted from the phosphor sheet 1 but is shielded from direct exposure to the laser beam 3. The light guide 12 consists of individual optical fibers that are juxtaposed to form a line at the input end of the light guide and that are bundled at the output end. The output end of the light guide is positioned adjacent a photodetector 13, which produces an electrical signal dependent upon the light intensity falling there on.

Suitable electrical connections are made to pass the output signal from the photo-detector 13 to a computer 20 which serves to control the light chopper 4 and the galvanometer mirror drive 6 and to perform image processing on the output signal. The output of the computer is additionally connected to a display unit 21, such as a VDU screen. Alternatively or additionally the output of the computer 20 is used to produce a permanent record of the raster image. The output can also be fed to a workstation for off-line processing and/or to an archive station etc. (not shown)

FIG. 2 illustrates the arrangement of the light guide member and of the stimulating ray reflection preventing means. The figure shows a cross sectional view in a vertical plane that is perpendicular to the scan line, i.e. in a plane perpendicular to the surface of the photostimulable phosphor screen when the screen is in a position to be scanned and perpendicular to the scan line.

A light guide member 12 with an input face 30 having an elliptical cross section is positioned so that the point where the beam of stimulating radiation impinges on the phosphor screen is situated in point P, being one of the foci of the ellipse defining the cross section of the input face of the light guide member.

The light guide member is further positioned so that its second focus P' is situated above surface of the photostimulable phosphor screen 33.

In the vicinity of the second focus P', a beam stop 34 is provided. In this embodiment the beam stop is metal plate covered by light absorbing mat black paint.

The operation of this device is as follows.

A stimulating laser beam 31 having a wavelength within a first wavelength range, impinges on the screen at location P. Apart from the generation of stimulated emission light of a second wavelength, the screen reflects part 32 of the stimulation light.

The reflected stimulation light which falls upon the input face 30 of the light guide member is reflected onto the second focus point P' where any further reflection is extinguished by the provision of a beam stop 34 in the vicinity of said second focus point.

FIG. 3 illustrates an alternate embodiment of a light guide member according to the present invention. In this embodiment, the light input end 30 has a substantially circular cross section in a plane perpendicular to a scanned line and the screen 33. The light guide 12 is arranged so that the axis A of a cylinder C comprising the light input end 30 does not coincide with the scanned line. Optionally, a light absorbing means 34 is provided for absorbing the light 32 reflected by the light input end 30

I claim:

1. A radiation image read out apparatus, comprising:
    a system for line-wise scanning a photostimulable phosphor screen carrying a radiation image by means of stimulating rays;
    a photo-electric transducer for converting light emitted by said phosphor screen, upon stimulation thereof by said stimulating rays, into an electric signal representation; and
    a light guide member for guiding said emitted light to said photo-electric transducer, said light guide member having a light input end and a light output end, said light input end being positioned in the vicinity of a line of said screen that is scanned by said stimulating rays and having a cross section in a plane perpendicular to a scanned line and perpendicular to said screen that is substantially elliptical, said light guide member being arranged so that one focus of the ellipse defining said elliptical cross section is positioned to coincide with the line that is scanned and the second focus of the ellipse defining said elliptical cross section is positioned above the photostimulable phosphor screen.

2. An apparatus according to claim 1 wherein a light absorbing means is provided in the vicinity of said second focus.

3. A radiation image read out apparatus, comprising;
- a system for line-wise scanning a planar photostimulable phosphor screen carrying a radiation image by means of stimulating rays;
- a photo-electric transducer for converting light emitted by said phosphor screen, upon stimulation thereof by said stimulating rays, into an electric signal representation; and
- a light guide member for guiding said emitted light to said photo-electric transducer, said light guide member having a light input end and a light output end, said light input end being positioned in the vicinity of a line of said screen that is scanned by said stimulating rays and having a cross section in a plane perpendicular to a scanned line and perpendicular to said screen that is substantially circular, said light guide member being arranged so that the axis of a cylinder comprising said circular cross section of said light input end does not coincide with the scanned line.

4. An apparatus according to claim 3, wherein a light absorbing means is provided for capturing light reflected by said light input end of said light guide member so as to prevent said reflected light from impinging on the scanned line.

5. An apparatus according to claims 1 or 3, wherein said light guide member comprises a bundle of optical fibers that are arranged to form a line at said light input end of said light guide member and that are bundled together at said light output end.

6. An apparatus according to claims 1 or 3 wherein said light guide member is made of light transmitting sheet material, one end being shaped into linear form and the other end being shaped into an annular or circular form.

7. An apparatus according to claims 1 or 3 wherein said system for line-wise scanning said screen with stimulating rays comprises
- a light source emitting light within the stimulation wavelength range of said phosphor screen,
- means for directing said light onto said screen and for deflecting said light in a first direction,
- means for transporting said screen in a direction perpendicular to said first direction.

* * * * *